(12) United States Patent
Kokuryu et al.

(10) Patent No.: US 8,935,325 B2
(45) Date of Patent: Jan. 13, 2015

(54) PORTABLE TERMINAL, MESSAGE NOTIFICATION METHOD, AND MESSAGE NOTIFICATION PROGRAM

(75) Inventors: Mineto Kokuryu, Osaka (JP); Shigeo Miyai, Osaka (JP)

(73) Assignee: KYOCERA Corporation, Kyoto (JP)

( * ) Notice: Subject to any disclaimer, the term of this patent is extended or adjusted under 35 U.S.C. 154(b) by 655 days.

(21) Appl. No.: 12/680,379

(22) PCT Filed: Sep. 25, 2008

(86) PCT No.: PCT/JP2008/067263
§ 371 (c)(1),
(2), (4) Date: Mar. 26, 2010

(87) PCT Pub. No.: WO2009/041477
PCT Pub. Date: Apr. 2, 2009

(65) Prior Publication Data
US 2011/0040835 A1 Feb. 17, 2011

(30) Foreign Application Priority Data

Sep. 28, 2007 (JP) .................................. 2007-254845

(51) Int. Cl.
*G06F 15/16* (2006.01)
*H04M 1/725* (2006.01)

(52) U.S. Cl.
CPC ...... *H04M 1/72552* (2013.01); *H04M 1/72572* (2013.01); *H04M 2250/10* (2013.01)
USPC ........................................................ 709/204

(58) Field of Classification Search
CPC ............. H04L 51/20; H04L 29/12783; H04M 2250/10
USPC ................................................... 709/206–207
See application file for complete search history.

(56) References Cited

U.S. PATENT DOCUMENTS 7,835,294 B2 * 11/2010 Shuster .......................... 370/252
2004/0128359 A1 * 7/2004 Horvitz et al. ................ 709/207
(Continued)

FOREIGN PATENT DOCUMENTS

| JP | 10-304452 | 11/1998 |
| JP | 2000-165501 A | 6/2000 |

(Continued)

OTHER PUBLICATIONS

Notice of Ground of Rejection dated Jun. 26, 2012, issued in counterpart Japanese Application No. 2007-254845.

(Continued)

*Primary Examiner* — Jason Recek
(74) *Attorney, Agent, or Firm* — Procopio, Cory, Hargreaves & Savitch LLP

(57) ABSTRACT

Address information stored as a transmission destination is effectively used. A mobile phone includes a position detection portion (S02) for obtaining current positional information, an EEPROM for storing address data in which positional information indicating a position and address information indicating a transmission destination are associated with each other, an extraction portion (S03) for extracting address information stored in association with the positional information located within a prescribed range from the current positional information detected by the position detection portion, and a message transmission portion (S08) for transmitting a fixed message to the transmission destination indicated by at least one address information extracted by the extraction portion.

15 Claims, 8 Drawing Sheets

(56) References Cited

U.S. PATENT DOCUMENTS

| | | | |
|---|---|---|---|
| 2005/0046580 A1* | 3/2005 | Miranda-Knapp et al. | 340/686.1 |
| 2007/0216572 A1* | 9/2007 | Schnabel | 342/357.1 |
| 2007/0232259 A1* | 10/2007 | Shiga et al. | 455/404.1 |
| 2007/0264977 A1* | 11/2007 | Zinn et al. | 455/414.1 |
| 2008/0082651 A1* | 4/2008 | Singh et al. | 709/224 |
| 2009/0019122 A1* | 1/2009 | Abhyanker | 709/206 |
| 2011/0053611 A1* | 3/2011 | Loeb et al. | 455/456.3 |
| 2011/0148654 A1* | 6/2011 | Lau et al. | 340/693.1 |

FOREIGN PATENT DOCUMENTS

| | | |
|---|---|---|
| JP | 2002-024113 A | 1/2002 |
| JP | 2004-317374 | 11/2004 |
| JP | 2004-357142 | 12/2004 |
| JP | 2005-39389 | 2/2005 |
| JP | 2005-130187 | 5/2005 |
| JP | 2006-262332 A | 9/2006 |
| JP | 2006-319454 A | 11/2006 |
| JP | 2007-079922 | 3/2007 |

OTHER PUBLICATIONS

Decision to Decline Amendment dated Mar. 5, 2013, issued in counterpart Japanese Application No. 2007-254845.

Notice of Ground of Rejection dated Oct. 30, 2012, issued in counterpart Japanese Application No. 2007-254845.

* cited by examiner

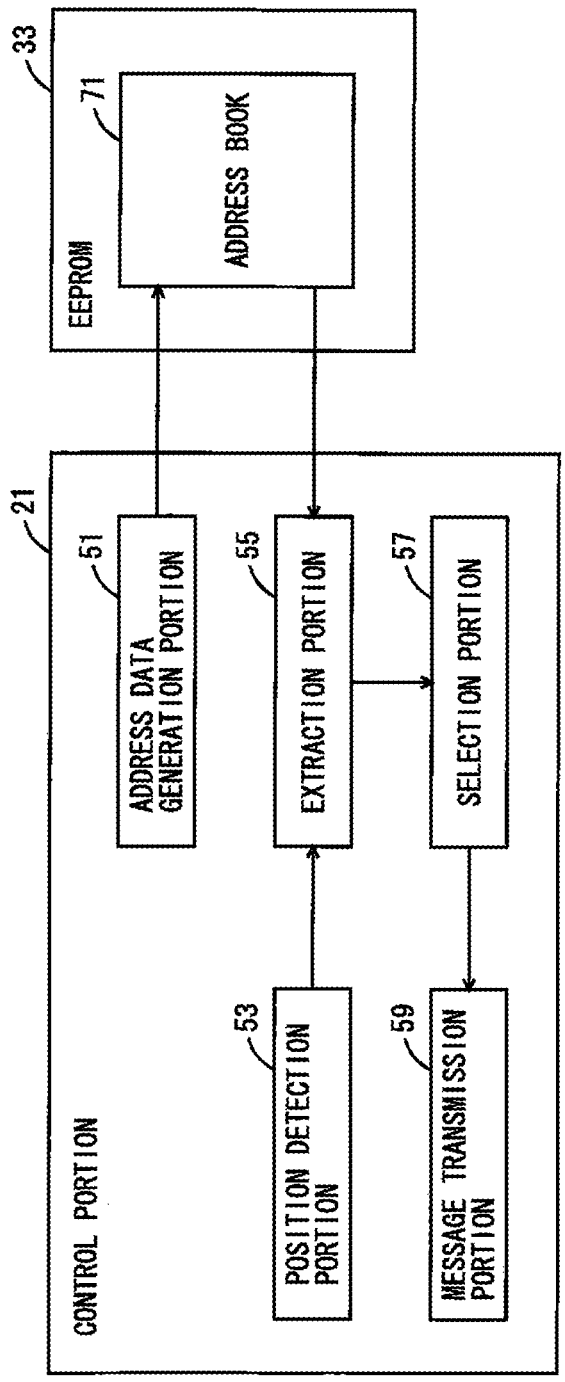

FIG. 5

```
【NEIGHBOR LIST】
    ☐  MR. SANYO
    ☐  MR. KUNITACHI
    ☐  MR. MIYAI

PLACE A CHECKMARK IN THE CHECKBOX OF ONE WHO YOU WANT TO SEND
   AN EMAIL CASUALLY, AMONG THOSE ABOVE, AND PRESS SEND BUTTON.
```

FIG. 6A (BUSINESS ASSOCIATES)

```
TO MR. XXX
THANK YOU FOR YOUR ONGOING SUPPORT.
I AM IN THE NEIGHBORHOOD ON BUSINESS.
I HOPE THIS FINDS YOU WELL.
```

FIG. 6B (FRIENDS)

```
HELLO.
I JUST HAPPENED TO BE IN YOUR NEIGHBORHOOD.
PLEASE SEND ME EMAIL WHEN YOU HAVE TIME.
```

PORTABLE TERMINAL, MESSAGE NOTIFICATION METHOD, AND MESSAGE NOTIFICATION PROGRAM

TECHNICAL FIELD

The present invention relates to a portable terminal, a message notification method and a message notification program embodied on a computer readable storage medium, and more particularly to a portable terminal transmitting messages such as emails, a message notification method executed in the portable terminal and a message notification program embodied on a computer readable storage medium.

BACKGROUND ART

In recent years, portable equipment, typified by mobile phones, is capable of sending/receiving emails and has address books stored therein for storing email addresses of recipients of emails. When the number of emails registered in an address book increases, unfortunately, it takes time to find a desired email address.

To address this problem, a communication terminal apparatus is known which has the date and time of incoming and outgoing calls stored in an incoming/outgoing call date storage region of telephone book data at the time of incoming and outgoing calls. In searching the telephone book, if the date and time stored in the incoming/outgoing call date storage region of each telephone book data is prior to a reference date and time, the telephone book data is deleted from the search result without being displayed as the data has not been used for a long time, thereby reducing the number of telephone book data displayed as a search result. Alternatively, a search result is displayed only when the date and time stored in the incoming/outgoing call date storage region is prior to a reference data and time, so that only the telephone book data that has not been used for a long time is displayed, thereby facilitating organizing the telephone book data, for example, by deleting unnecessary telephone book data.

However, email addresses that have been unused are not displayed even if they are extracted as a result of search, and therefore they are left unused.

DISCLOSURE OF THE INVENTION

Problems to be Solved by the Invention

The present invention is made to solve the aforementioned problem. An object of the present invention is to provide a portable terminal capable of effectively using addresses stored as transmission destinations.

Another object of the present invention is to provide a message notification method allowing effective use of addresses stored as transmission destinations.

Yet another object of the present invention is to provide a message notification program embodied on a computer readable storage medium allowing effective use of addresses stored as transmission destinations.

Means for Solving the Problems

In order to achieve the aforementioned object, in accordance with an aspect of the present invention, a portable terminal includes: current positional information obtaining portion to obtain current positional information indicating a current position; address data storage portion to store address data in which positional information indicating a position and address information indicating a transmission destination are associated with each other; extraction portion to extract the address information stored in association with the positional information located within a prescribed range from the current positional information obtained by the current positional information obtaining portion; and transmission portion to transmit a prescribed message to the transmission destination indicated by at least one address information extracted by the extraction portion.

In accordance with another aspect of the present invention, a message notification method includes the steps of: storing address data in which positional information indicating a position and address information indicating a transmission destination are associated with each other; obtaining current positional information indicating a current position; extracting the address information stored in association with the positional information located within a prescribed range from the obtained current positional information; and transmitting a prescribed message to the transmission destination indicated by the extracted at least one address information.

In accordance with a further aspect of the present invention, a message notification program embodied on a computer readable storage medium allows a computer to execute the steps of: storing address data in which positional information indicating a position and address information indicating a transmission destination are associated with each other; obtaining current positional information indicating a current position; extracting the address information stored in association with the positional information located within a prescribed range from the obtained current positional information; and transmitting a prescribed message to the transmission destination indicated by the extracted at least one address information.

In accordance with this aspect, it is possible to provide a message notification program that allows effective use of address information stored as a transmission destination.

BRIEF DESCRIPTION OF THE DRAWINGS

FIG. 3 is a functional block diagram showing an overall function of a control portion of the mobile phone together with data stored in EEPROM in a first embodiment.

FIG. 4 is a diagram showing a format of address data.

FIG. 5 shows an exemplary selection screen.

FIG. 6A shows a fixed message predetermined for business use.

FIG. 6B shows a fixed message predetermined for private use.

DESCRIPTION OF REFERENCE CHARACTERS

Figure 1A:
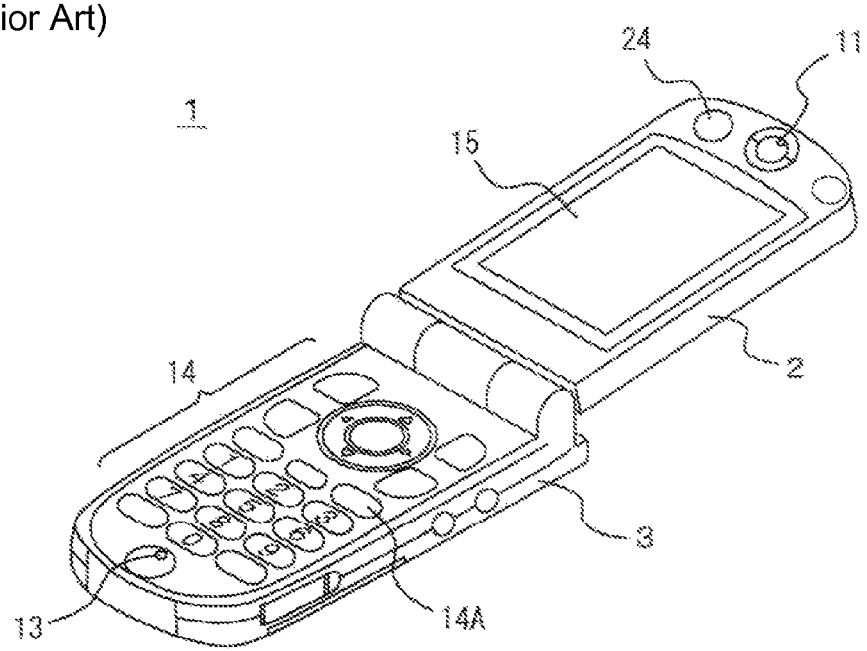
FIG. 1A shows an external view of a mobile phone in an open style.

1 mobile phone, 11 first speaker, 12 second speaker, 13 microphone, 14 operation key, 15 LCD, 19 infrared communication portion, 21 control portion, 22 communication circuit, 24 camera, 27A flash memory, 28 codec portion, 30 display control portion, 38 GPS sensor, 31 ROM, 32 RAM, 33 EEPROM, 51 address data generation portion, 53 position detection portion, 55, 55A extraction portion, 57 selection portion, 59 message transmission portion, 61 base station detection portion, 63 moving speed detection portion, 71 address book.

BEST MODES FOR CARRYING OUT THE INVENTION

In the following, embodiments of the present invention will be described with reference to the figures. In the following description, the same parts are denoted with the same reference numerals. Their names and functions are also the same. Therefore, a detailed description thereof will not be repeated.

First Embodiment

Figure 1B:
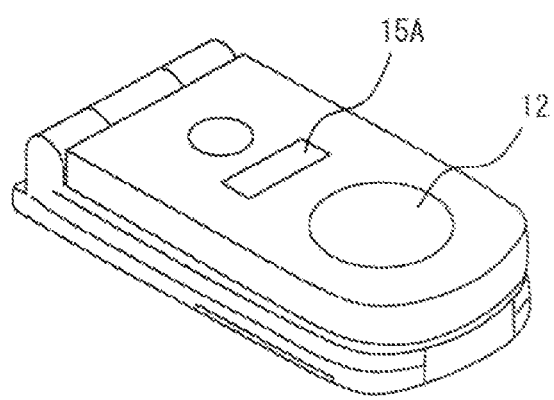
FIG. 1B shows an external view of a mobile phone in a closed style.

FIG. 1A and FIG. 1B are perspective views each showing an external view of a mobile phone in an embodiment of the present invention. The mobile phone is an example of portable communication terminals. FIG. 1A shows an external view of a mobile phone in an open style and FIG. 1B shows an external view of a mobile phone in a closed style. Referring to FIG. 1A and FIG. 1B, a mobile phone 1 includes an operation-side portion 3 and a display-side portion 2.

Operation-side portion 3 includes a power key 14A, operation keys 14 including ten keys, a call key and the like, and a microphone 13 arranged on the inner surface thereof. Display-side portion 2 includes a liquid crystal display (LCD) 15, a first speaker 11 as a receiver, and a camera 24 arranged on the inner surface thereof, and includes a small LCD 15A and a second speaker 12 arranged on the outer surface thereof.

Although mobile phone 1 shown in this example includes LCD 15, LCD 15 may be replaced by an organic EL (Electro Luminescence) display.

Operation-side portion 3 and display-side portion 2 are rotatably jointed to each other with a hinge mechanism so that operation-side portion 3 and display-side portion 2 can be opened and closed freely. When mobile phone 1 is folded and operation-side portion 3 and display-side portion 2 are in the closed state, mobile phone 1 is in the closed style. When mobile phone 1 is opened and operation-side portion 3 and display-side portion 2 are in the open state, mobile phone 1 is in the open style.

Figure 2:
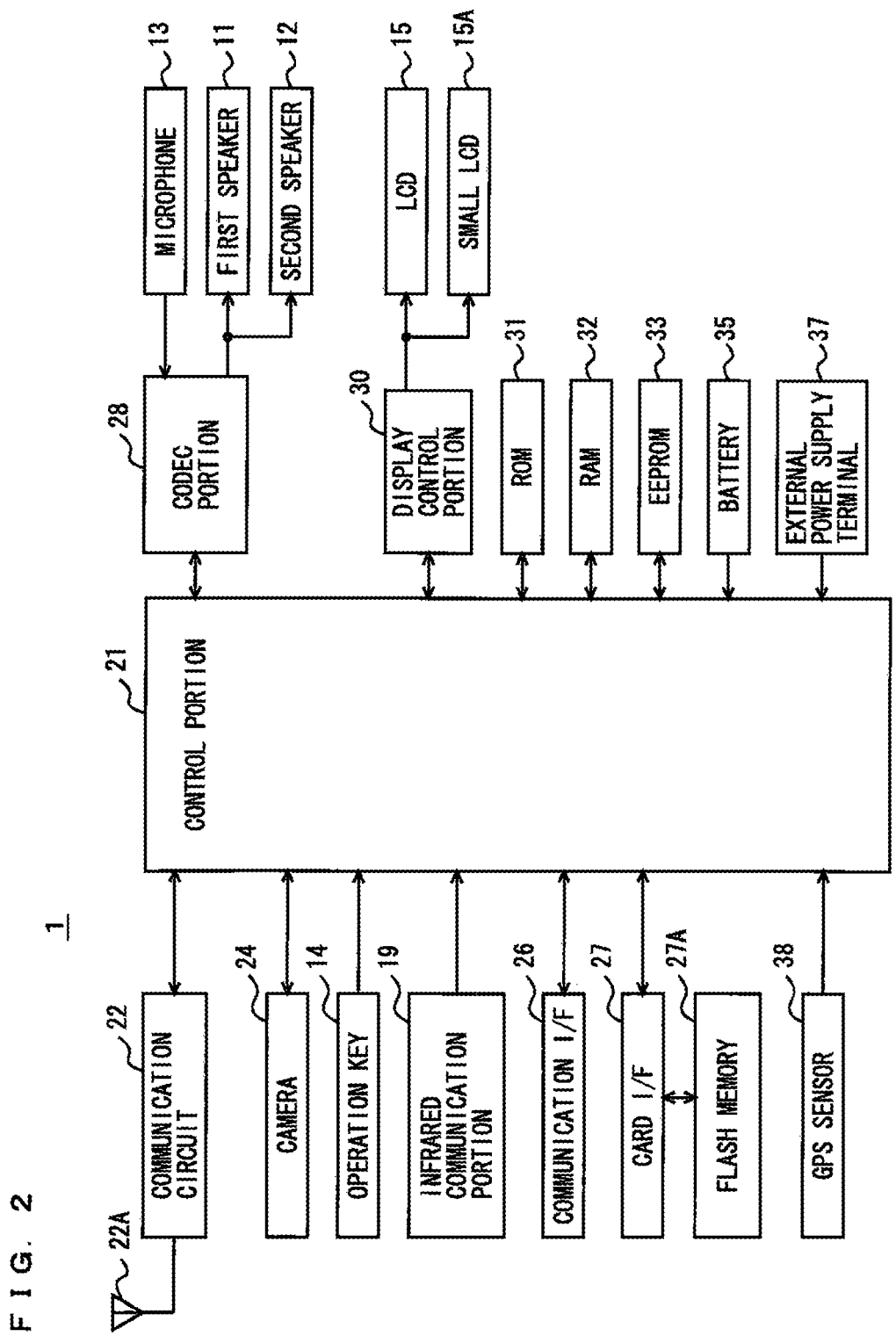
FIG. 2 is a functional block diagram showing an exemplary function of the mobile phone in the present embodiment.

FIG. 2 is a functional block diagram showing an exemplary function of the mobile phone in the present embodiment. Referring to FIG. 2, mobile phone 1 includes a control portion 21 for controlling the entire mobile phone 1, a communication circuit 22 connected to an antenna 22A, a codec portion 28 for processing audio data, and microphone 13, first speaker 11, and second speaker 12, each connected to codec portion 28, and in addition, camera 24, operation keys 14 accepting input of operations by the user, an infrared communication portion 19, a communication interface (I/F) 26, a display control portion 30 for controlling display on LCD 15, a ROM (Read Only Memory) 31 for storing, for example, a program executed in control portion 21, an RAM (Random Access Memory) 32 for use as a work area for control portion 21, an EEPROM (Electronically Erasable and Programmable ROM) 33 storing data, application programs, etc. in a non-volatile manner, a card interface (I/F) 27, a GPS (Global Positioning System) sensor 38, a battery 35 for supplying electric power to the entire mobile phone 1, and an external power supply terminal 37 connected to an external power supply.

Communication circuit 22 connects mobile phone 1 to a network. The network here is a network in a W-CDMA (Wideband Code Division Multiple Access) communication method. Communication circuit 22 wirelessly communicates with a base station apparatus connected to the W-CDMA network. A radio signal transmitted by the base station apparatus is received by antenna 22A. First communication circuit 22 receives a radio signal received by antenna 22A and outputs a signal demodulated from the radio signal to control portion 21. When the signal demodulated from the radio signal is an audio signal, control portion 21 outputs the audio signal to codec portion 28.

Radio circuit 22 receives a transmission signal from control portion 21 and then outputs a radio signal modulated from the signal to antenna 22A. Control portion 21 receives the audio signal from codec portion 28 to output the audio signal to first communication circuit 22. The radio signal transmitted from antenna 22A is received by the W-CDMA base station apparatus.

Codec portion 28 decodes an audio signal input from control portion 21, converts the decoded digital audio signal into an analog signal, amplifies the analog signal, and then outputs the amplified signal to first speaker 11 or second speaker 12. In addition, codec portion 28 receives an analog audio signal from microphone 13, converts the audio signal into a digital signal, encodes the digital signal, and then outputs the encoded audio signal to control portion 21.

The user operates operation key 14 to set mobile phone 1 to a hands-free mode. Even if the hands-free mode is not set when mobile phone 1 is in the open style and in a call state, control portion 21 sets the hands-free mode when the state of mobile phone 1 changes to the closed style. Therefore, when mobile phone 1 is in the open style and in a call state and is not set in the hands-free mode, codec portion 28 outputs an audio signal to first speaker 11, and when the state of mobile phone 1 changes to the closed style, codec portion 28 outputs an audio signal to second speaker 12.

Display control portion 30 is controlled by control portion 21 and controls LCD 15 in accordance with an instruction input from control portion 21 to allow LCD 15 to display an operation screen or an image. The image displayed on LCD 15 includes moving images and still images. Display control portion 30 also controls small LCD 15A.

A removable flash memory 27A is attached to card I/F 27. Control portion 21 can access flash memory 27A through card I/F 27. Although, in this example, a program to be executed by control portion 21 is stored in ROM 31, the program may be stored in flash memory 27A and may be read from flash memory 27A to be executed by control portion 21. A recording medium for storing a program is not limited to flash memory 27A and may be a flexible disk, a cassette tape, an optical disk (CD-ROM (Compact Disc-ROM)/MO (Magnetic Optical Disc)/MD (Mini Disc)/DVD (Digital Versatile Disc)), an IC card, an optical card, a semiconductor memory such as a mask ROM, EPROM (Erasable Programmable ROM) or EEPROM (Electronically EPROM), or the like.

Alternatively, mobile phone 1 may be connected to the Internet through communication circuit 22 so that a program is downloaded from a computer connected to the Internet and then executed by control portion 21. Programs referred to herein include not only a program directly executable by control portion 21 but a source program, a compressed program, an encrypted program, and the like.

Camera 24 includes a lens and an optoelectronic transducer such as a CMOS (Complementary Metal Oxide Semiconductor) sensor to focus light collected by the lens onto the CMOS sensor. The CMOS sensor then optoelectronically converts the received light and outputs image data to control portion 21. Camera 24 is controlled by control portion 21 and starts picking up an image on an instruction from control portion 21 to output the obtained still image data or moving image data to control portion 21.

Infrared communication portion 19 transmits/receives data using infrared as a medium. Although it is shown here that data is transmitted/received using infrared as a medium, communication with external equipment may be realized by wireless communication using, for example, electromagnetic waves in accordance with IrDA (Infrared Data Association) standard.

Communication I/F 26 is an interface for connecting mobile phone 1 to a computer. Communication I/F 26 may be a serial interface or a parallel interface. When an external computer is connected to communication I/F 26 through a communication cable, control portion 21 can communicate with the external computer.

GPS sensor 38 receives radio waves from a GPS satellite in the Global Positioning System (GPS) and outputs a signal indicating the current position on the map to control portion 21.

Battery 35 is a secondary battery such as a lithium polymer battery, a NiCad battery, or a nickel metal hydride battery to supply power to the enter mobile phone 1. External power supply terminal 37 is connected to an external power supply to supply electric power supplied from the external power supply to the entire mobile phone 1. The external power supply is an A/C adapter connected a commercial power supply or USB-compliant equipment such as a personal computer connected with a USB cable. When the external power supply is connected to external power supply terminal 37, mobile phone 1 consumes power supplied from the external power supply in preference to battery 35.

FIG. 3 is a functional block diagram showing an overall function of the control portion of the mobile phone together with data stored in EEPROM 33 in the first embodiment. Referring to FIG. 3, an address book 71 is stored in EEPROM 33. Address book 71 includes at least one address data. The address data associates positional information indicating a position with address information indicating a transmission destination.

FIG. 4 is a diagram showing an exemplary format of the address data. Referring to FIG. 4, the address data includes an item of name, an item of transmission destination address, an item of address, and an item of GPS information. In the item of name, identification information such as a name for identifying an individual is set. The item of name may be formed of a code etc. as long as it is information that can identify an individual. In the item of transmission destination address, address information is set indicating a transmission destination allocated to the individual identified by the identification information set in the item of name. Here, an email address is used as the address information indicating a transmission destination. In place of or in addition to an email address, for example, a message address allocated to the mobile phone or an address including a telephone number may be used. In the item of address, the address at which the individual identified by the identification information set in the item of name is resident is set. In place of or in addition to an address, a postal code may be used. In the item of GPS information, GPS information of the position at which the individual identified by the identification information set in the item of name is resident is set. The GPS information is formed of a latitude and a longitude. In the following, positional information includes a postal code, an address, and GPS information.

Returning to FIG. 3, control portion 21 includes an address data generation portion 51 generating address data to be registered in address book 71, a position detection portion 53 for obtaining the current positional information indicating the current position, an extraction portion 55 extracting address data from the address book based on the obtained current positional information, a selection portion 57 selecting any of the extracted address data, and a message transmission portion 59 transmitting a prescribed message to the address information included in the selected address data.

Address data generation portion 51 generates address data based on the information input by the user operating operation keys 14 and adds the generated address data to address book 71 stored in EEPROM 33. The address data generation portion receives a name, an address, and an email address to set them in the item of name, the item of address, and the item of transmission destination address, respectively. When an email address included in an email that has already been received is specified, that email address may be set in the item of transmission destination address. In addition, address data generation portion 51 adds address data received by infrared communication portion 19 from another mobile phone to address book 71.

Furthermore, address data generation portion 51 edits the address data included in address book 71 stored in EEPROM 33. Specifically, GPS information is added to the address data. When the user inputs an operation to give an instruction to obtain GPS information on operation keys 14 with the address data being selected, address data generation portion 51 obtains a latitude and a longitude based on a signal received by GPS sensor 38 from a satellite and sets the obtained latitude and longitude in the item of GPS information of the selected address data. It is effective when the user who carries mobile phone 1 is located at the address of the address data. It is noted that address data generation portion 51 may calculate a longitude and a latitude from a signal received by GPS sensor 38 from a satellite or may transmit a signal output by GPS sensor 38 to a server connected to the Internet to receive the latitude and longitude sent back from the server.

When the address data included in address book 71 stored in EEPROM 33 is edited, address data generation portion 51 may send the address to a server connected to the Internet, receive GPS information of that address from the server, and set the received GPS information in the item of GPS information.

When the user inputs a message notification instruction for transmitting a message to operation key 14, position detection portion 53 obtains the current positional information indicating the current position. Position detection portion 53 outputs the obtained current positional information to extraction portion 55. Position detection portion 53 obtains a latitude and a longitude as positional information based on the signal received by GPS sensor 38 from a satellite. It is noted that position detection portion 53 may calculate a latitude and a latitude from a signal received by GPS sensor 38 from a satellite or may transmit a signal output by GPS sensor 38 to a server connected to the Internet to receive the latitude and longitude sent back from the server.

Extraction portion 55 extracts, from address data included in address book 71, address data including positional information indicating a position included in a prescribed range from the position specified by the current positional information input from position detection portion 53. Then, a neighbor list including the extracted address data is generated and temporarily stored in RAM 32. A prescribed range is a range of a predetermined distance, for example, 50 km. The distance between two points is obtained from the current positional information (latitude and longitude) input from position detection portion 53 and the GPS information (latitude and longitude) set in the address data. If the obtained distance is 50 km or less, that address data is extracted. Extraction portion 55 outputs the neighbor list including the extracted address data to selection portion 57. When a plurality of address data are extracted, extraction portion 55 outputs the neighbor list for all of the extracted plurality of address data to selection portion 57.

Selection portion 57 selects any of the address data included in the neighbor list input from extraction portion 55. Specifically, a selection screen including the name set in the address data for accepting selection is output to display control portion 30 and displayed on LCD 15. Then, when the user inputs an instruction to select a name displayed on LCD 15, using operation key 14, selection portion 57 accepts selection of the name. Selection portion 57 selects address data that includes the name specified by the instruction input to operation key 14. Selection portion 57 outputs the selected address data to message transmission portion 59. When an instruction to select a plurality of names is input, selection portion 57 selects a plurality of address data including the respective specified plurality of names and outputs the selected plurality of address data to message transmission portion 59.

FIG. 5 shows an exemplary selection screen. Referring to FIG. 5, the selection screen displays three names to accept selection. Specifically, the displayed three names are "Mr. Sanyo," "Mr. Kunitachi," and "Mr. Miyai," with a check box displayed on the left of each name. When the user operates operation key 14 to input an operation for checking the check box, the check box is marked. Selection portion 57 selects the name corresponding to the checked check box.

Returning to FIG. 3, message transmission portion 59 generates an email including a predetermined message (fixed message) which is directed to an email address set in the item of transmission destination address of the address data input from selection portion 57. Then, message transmission portion 59 transmits the generated email. Specifically, communication circuit 22 is controlled to transmit the email to an email server.

FIG. 6A and FIG. 6B show examples of fixed messages. FIG. 6A shows a fixed message predetermined for business use, and FIG. 6B shows a fixed message predetermined for private use. In FIG. 6A, "XXX" of "Mr. XXX" is replaced with a set value in the item of name of the address data. Which of the fixed message for business use and the fixed message for private use is used may be preset in the address data. Although two kinds of fixed messages, namely, business use and private use, are shown here, more than two kinds of fixed messages may be predetermined. Furthermore, the user may be allowed to edit a fixed message before sending an email.

Figure 7:
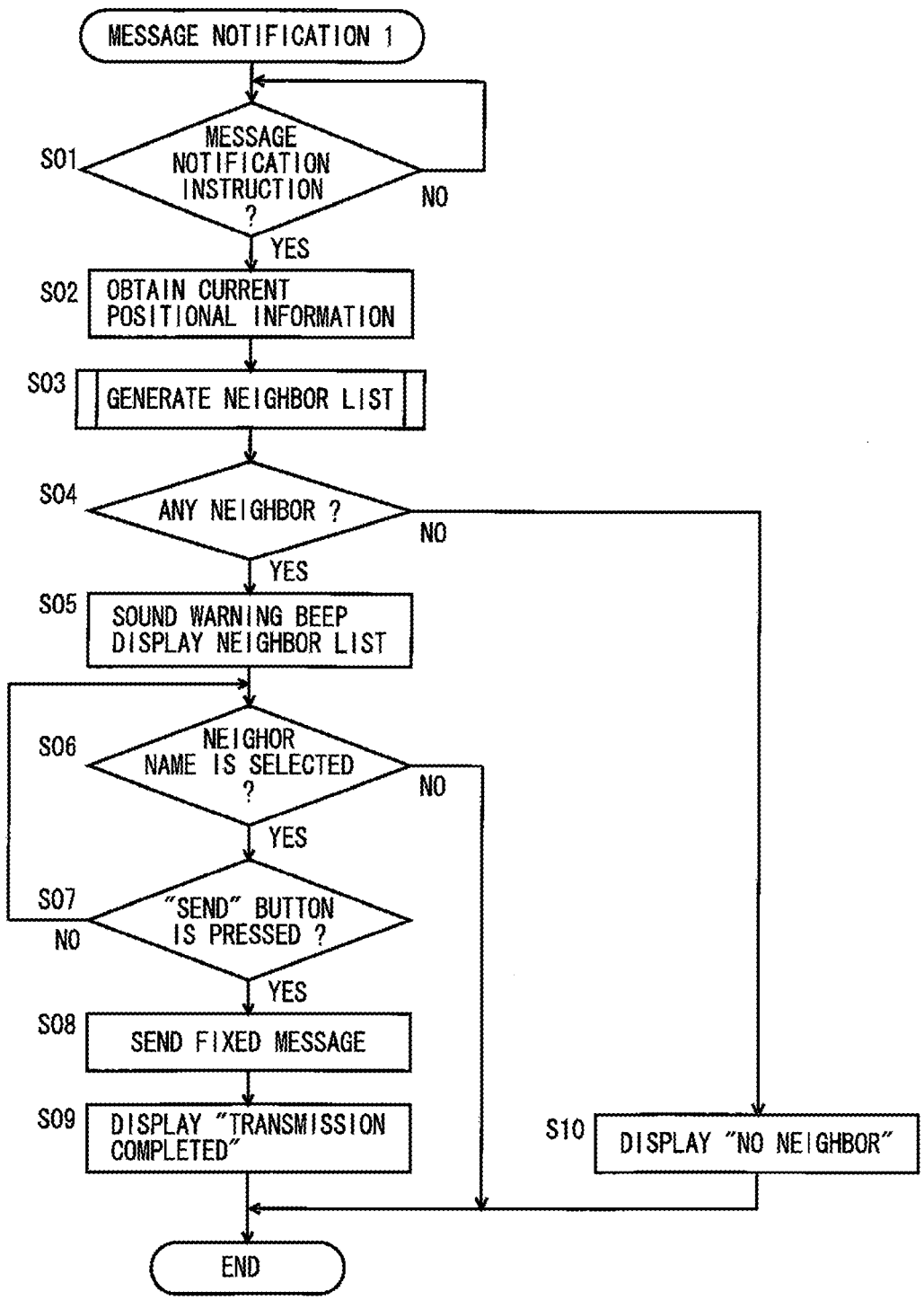
FIG. 7 is a first flowchart showing an exemplary flow of a message notification process.

FIG. 7 is a first flowchart showing an exemplary flow of a message notification process. The message notification process is a process executed by control portion 21 when control portion 21 executes a message notification program.

Referring to FIG. 7, control portion 21 determines whether or not a message notification instruction for transmitting a message is input to operation key 14 (step S01). The process is on standby until a message notification instruction is input (NO in step S01). When a message notification instruction is input (YES in step S01), the process proceeds to step S02. In other words, the message notification process is a process executed on condition that a message notification instruction is input. A key for inputting a message notification instruction may be provided beforehand in operation keys 14, so that upon detection of pressing on the key, it is determined that a message notification instruction is input.

In step S02, the current positional information indicating the current position is obtained. A latitude and a longitude are obtained as positional information based on a signal received from a satellite by GPS sensor 38.

Then, a neighbor list creation process is executed (step S03). The neighbor list creation process, which will be described later, is a process of creating a neighbor list including address data of those who have their addresses within a prescribed distance from the position indicated by the current positional information, here, within 50 km.

In the next step S04, it is determined whether a neighbor exists or not. If one or more address data is included in the neighbor list created in step S03, it is determined that a neighbor exists. If a neighbor exists, the process proceeds to step S05, and if not, the process proceeds to step S10. In step S10, the absence of a neighbor is displayed on LCD 15, and the process ends.

In step S05, a warning beep is sounded and a neighbor list is displayed on LCD 15. Specifically, a buzzer is set off from second speaker 12, and the selection screen shown in FIG. 5 shows up on LCD 15. This can notify the user of mobile phone 1 that those who are registered in the address book include the one whose address is within 50 km from the current position. Furthermore, since the selection screen includes the name set in the item of name of the address data included in the neighbor list, the name whose address is within 50 km from the current position can be recognized.

Next, it is determined whether at least one of the names displayed on the selection screen is selected or not (step S06). When the user inputs an instruction to select a name displayed on LCD 15 using operation key 14, selection of the name is accepted. If an instruction to select a plurality of names is input, selection of a plurality of names is accepted in accordance with the instruction. Then, address data including the selected name is extracted from address book 71. If at least one of the names displayed on the selection screen is selected, the process proceeds to step S07. If not, the process ends.

In step S07, it is determined whether a "send" button provided beforehand in operation keys 14 is pressed or not. If the "send" button is pressed, the process proceeds to step S08. If not, the process returns to step S06. This is done in order to transmit an email based on the user's instruction. For example, when a "cancel" button provided aside from the "send" button is pressed, the process may be ended. In this case, an email is prevented from being sent after selection of a name.

In step S08, a fixed message is transmitted. Specifically, an email including a fixed message shown in FIG. 6A or FIG. 6B is generated to be directed to the email address set in the item of transmission destination address of the address data selected in step S06. Then, the generated email is transmitted to an email server through communication circuit 22.

Then, a "transmission completed" message indicating the transmission is completed is displayed on LCD 15 (step S09). This can notify the user of mobile phone 1 that the fixed message has been transmitted.

Figure 8:
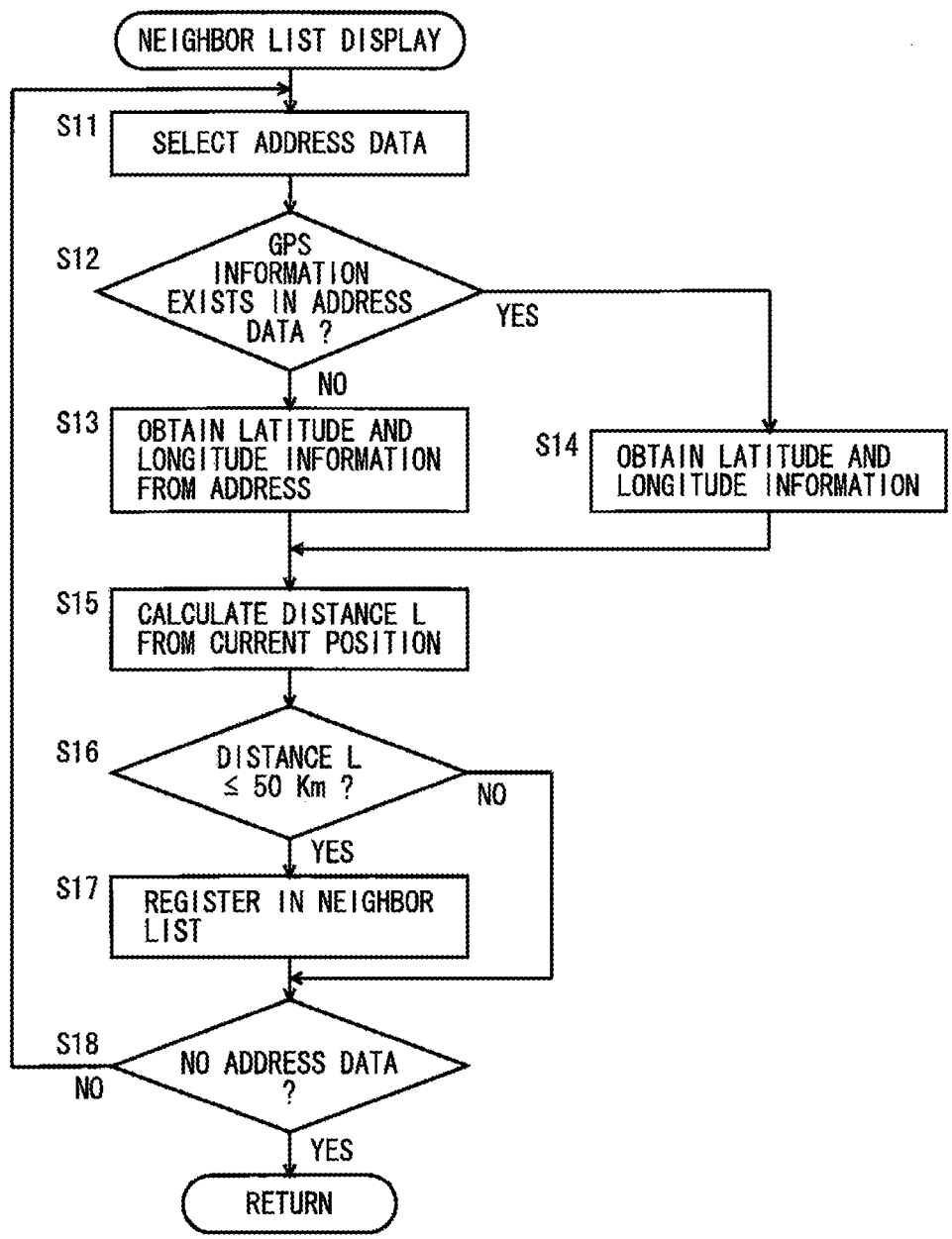
FIG. 8 is a flowchart showing an exemplary flow of a neighbor list creation process.

FIG. 8 is a flowchart showing an exemplary flow of a neighbor list creation process. The neighbor list creation process is a process executed in step S03 in FIG. 7. Referring to FIG. 8, control portion 21 selects one of the address data included in address book 71 stored in EEPROM 33, as a process target (step S11).

Then, it is determined whether or not GPS information is set in the item of GPS information of the selected address data (step S12). If GPS information is set, the process proceeds to step S14. If not, the process proceeds to step S13. In step S13, a latitude and a longitude are obtained as positional information based on the address set in the item of address of the selected address data, and the process proceeds to step S15. The address is transmitted to a server connected to the Internet, so that the latitude and longitude sent back from the server is received. On the other hand, in step S14, the latitude and longitude set in the item of GPS information of the selected address data is obtained as positional information, and the process proceeds to step S15.

In step S15, the distance from the current position is calculated. Distance L between the position defined by the latitude and longitude obtained in step S13 or step S14 and the position defined by the positional information obtained in step S02 in FIG. 7 is calculated. Then, it is determined whether or not the calculated distance L is equal to or less than a predetermined distance, here, 50 km. If distance L is 50 km or less, the process proceeds to step S17. If not, step S17 is skipped, and the process proceeds to step S18.

In step S17, the address data selected as a process target in step S11 is registered in the neighbor list, and the process proceeds to step S18.

In step S18, it is determined whether or not there exists any address data that is not selected as a process target in address book 71. If there exists no address data that is not selected, the process returns to the message notification process. If there exists any address data that is not selected, the process returns to step S11.

In the foregoing first embodiment, a fixed message is sent to the address information associated by the address data with the name selected from the neighbor list by selection portion 57. Alternatively, a fixed message may be sent to the address information set in the address data included in the neighbor list. In this case, selection portion 57 is not necessary.

As described above, when the current positional information is obtained, mobile phone 1 in the first embodiment extracts address data including positional information indicating a position within a prescribed range from the position indicated by the obtained current positional information. When at least one address data is extracted, a neighbor list is created. Then, a fixed message is transmitted to the email address included in the address data selected by the user from the neighbor list. Since a message is transmitted to the email address related to the positional information indicating a position within a prescribed range from the position indicated by the current positional information, a message can be transmitted to the recipient that is selected automatically.

Second Embodiment

In mobile phone 1 in the foregoing first embodiment, when the user inputs a message notification instruction for transmitting a message on operation key 14, a neighbor list is created and an email is transmitted. Mobile phone 1 in a second embodiment differs from mobile phone 1 in the first embodiment in that a neighbor list is automatically created and an email is transmitted. In the following, the difference from mobile phone 1 in the first embodiment is mainly described.

Figure 9:
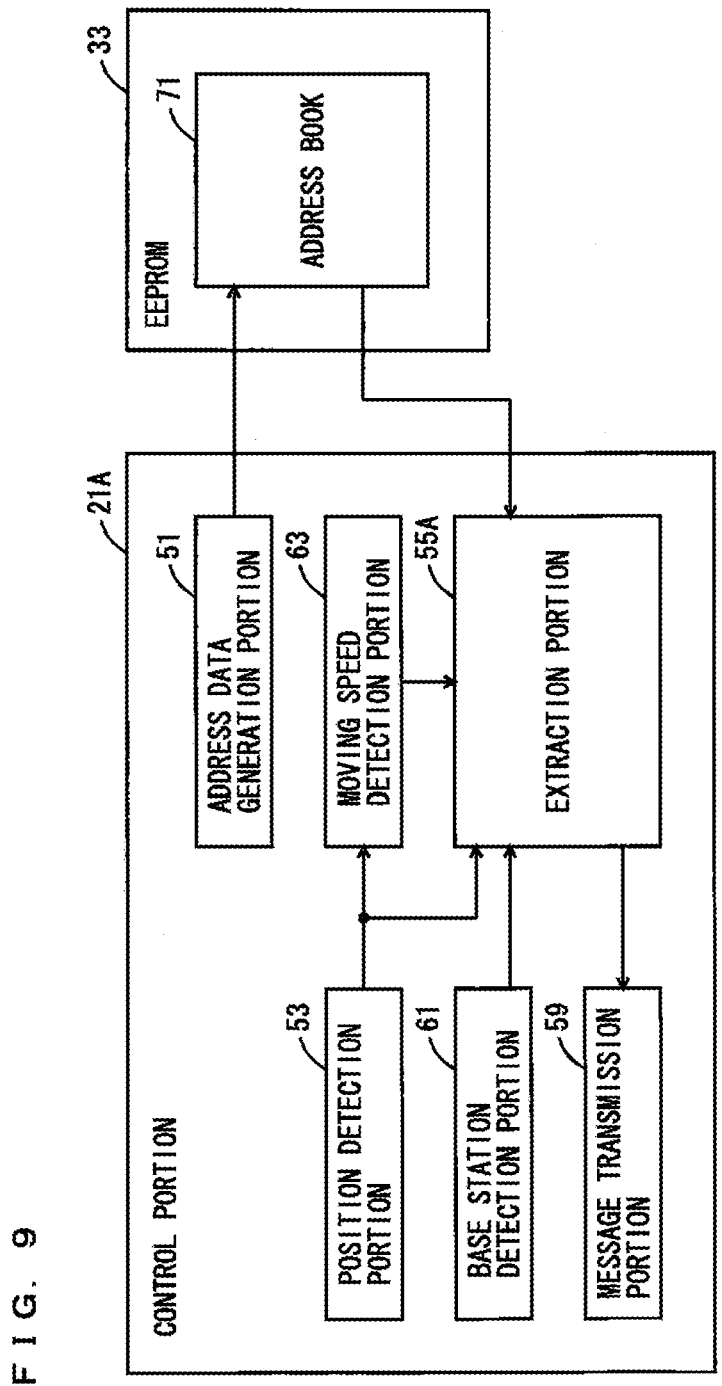
FIG. 9 is a functional block diagram showing an overall function of the control portion of the mobile phone together with data stored in EEPROM in a second embodiment.

FIG. 9 is a functional block diagram showing an overall function of the control portion of the mobile phone together with data stored in EEPROM 33 in the second embodiment. FIG. 9 differs from the functional block diagram shown in FIG. 3 in that selection portion 57 is deleted, an extraction portion 55A is changed, and a base station detection portion 61 and a moving speed detection portion 63 are added.

Base station detection portion 61 detects that there is a change of base stations, based on information received by communication circuit 22 from a base station. Specifically, it is detected that there is a change of base stations, based on a CBS (Cell Broadcasting Service) signal received from a base station. When detecting that there is a change of base stations with which communication circuit 22 communicates, base station detection portion 61 outputs a change signal to extraction portion 55A.

Position detection portion 53 outputs the detected positional information to moving speed detection portion 63 and extraction portion 55A. Moving speed detection portion 63 detects a moving speed from two positional information input at different points of time from position detection portion 53 and the difference between the respective points of time at which the two positional information are detected. A moving speed is calculated from the distance found by the first positional information input from position detection portion 53 at the first point of time and the second positional information input from position detection portion 53 at the second point of time, and from the time interval between the first point of time and the second point of time. Moving speed detection portion 63 outputs the calculated moving speed to extraction portion 55A.

When it is detected that there is a change of base stations with which communication circuit 22 communicates, movement of a prescribed distance or longer can be detected, because a base station can communicate within a range of a few kilometers. Two or more changes of base stations may be detected, rather than one change of base stations. Detection of two or more changes of base stations enables detection of movement of a longer distance.

If the moving speed detected by moving speed detection portion 63 is a prescribed speed or less after a change signal is input from base station detection portion 61, extraction portion 55A extracts, from the address data included in address book 71, address data including positional information indicating a position within a prescribed range from the position indicated by the current positional information. A prescribed speed is preferably an upper limit value of the walking speed, for example, 3 km per hour. When it is detected that the moving speed is a prescribed speed or less, it is high likely that the user of mobile phone 1 walks. When extracting address data, extraction portion 55A outputs the extracted address data to message transmission portion 59.

However, when the moving speed detected by moving speed detection portion 63 is greater than a prescribed speed after a change signal is input from base station detection portion 61, extraction portion 55A does not extract address data. When it is detected that the moving speed is greater than a prescribed speed, it is high likely that the user of mobile phone 1 is moving, for example, by train.

Movement of a prescribed distance or longer is detected by detection of a change of base stations, and if the subsequent moving speed is a prescribed speed or less, it can be determined that the user is walking after moving by train or the like. On the other hand, movement over a prescribed distance is detected by detection of a change of base stations, and if the subsequent moving speed is greater than a prescribed speed, it can be determined that the user is moving, for example, on board the train.

Since message transmission portion 59 sends an email after the user of mobile phone 1 moves a prescribed distance or longer by transportation portion, for example, by train, the email can be transmitted to the user who has his/her address within a prescribed range after movement.

Figure 10:
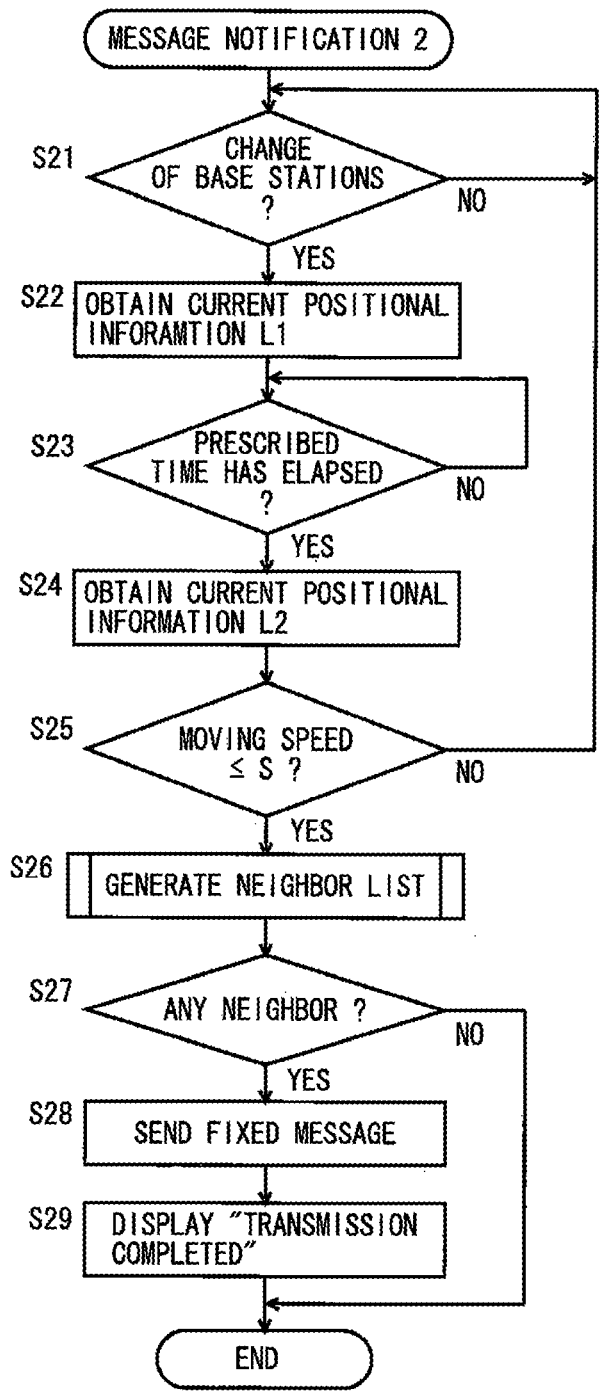
FIG. 10 is a second flowchart showing an exemplary flow of a message notification process.

FIG. 10 is a second flowchart showing an exemplary flow of a message notification process. Referring to FIG. 10, control portion 21 determines whether or not there is a change of base stations with which communication circuit 22 communicates (step S21). The process is on standby until a change of base stations takes place (NO in step S21). When a change of base stations takes place, the process proceeds to step S22. Movement of a prescribed distance or longer is detected by a change of base stations. In other words, the message notification process in the second embodiment is a process executed when there is a change of base stations with which communication circuit 22 communicates, that is, when mobile phone 1 and the user thereof move a prescribed distance or longer.

In step S22, positional information indicating the current position is obtained. A latitude and a longitude are obtained as positional information based on a signal received from a satellite by GPS sensor 38. In the next step S23, the process is on standby until a prescribed time has elapsed (NO in step S23). When a prescribed time has elapsed (YES in step S23), the process proceeds to step S24. A prescribed time is determined by the precision of the latitude and longitude calculated from the signal input from GPS sensor 38. The time can be shortened if the precision is good. A prescribed time may be, for example, 10 minutes or longer. Then, in step S24, positional information indicating the current position is obtained, similarly to step S22, and the process proceeds to step S25. The positional information obtained in step S24 and the positional information obtained in step S22 are obtained at the respective different points of time.

In step S25, a moving speed is obtained from the positional information obtained in step S24, the positional information obtained in step S22, and a prescribed time, and is then compared with a threshold value S. If the moving speed is equal to or less than threshold value S, the process proceeds to step S26. If not, the process returns to step S21. If the moving speed is not equal to or less than threshold value S, it is high likely that the user is moving.

In step S26, a neighbor list creation process is executed. The neighbor list creation process shown in FIG. 8 is executed. In the next step S27, it is determined whether or not there exists a neighbor. It is determined that there exists a neighbor if one or more address data is included in the neighbor list created in step S26. If there exists a neighbor, the process proceeds to step S28, and if not, the process ends.

In step S28, a fixed message is sent. Specifically, an email including the fixed message shown in FIG. 6A or FIG. 6B is generated to be directed to the email address set in the item of transmission destination address of the address data included in the neighbor list created in step S26. Then, the generated email is transmitted to an email server through communication circuit 22.

In the next step S29, a message "transmission completed" indicating that transmission of a fixed message is completed is displayed on LCD 15. The user of mobile phone 1 can be notified that a fixed message has been transmitted. Accordingly, the user of mobile phone 1 can be notified that those who are registered in the address book include the ones whose addresses are within 50 km from the current position and that a fixed message has been transmitted to them.

Here, in step S23, a moving speed is detected from the current positional information at the points of time separated by a prescribed time interval (10 minutes), and if the detected moving speed is equal to or less than threshold value S, a neighbor list is created. However, a moving speed may be detected multiple times within a prescribed period of time, and if all of the detected plurality of moving speeds are equal to or less than threshold value S, a neighbor list may be created. For example, a moving speed is detected at intervals of one minute, and if all of the ten moving speeds detected during 10 minutes are equal to or less than prescribed threshold value S, a neighbor list is created and a fixed message is transmitted. This prevents, for example, a fixed message from being transmitted while the user is changing trains at a station during travel by train.

As described above, mobile phone 1 in the second embodiment detects movement over a prescribed distance by detecting a change of base stations, and if the subsequent moving speed is a prescribed speed or less, extracts address data including positional information indicating a position within a prescribed range from the position indicated by the obtained current positional information. When at least one address data is extracted, a neighbor list is created. Then, a fixed message is transmitted to the email address set in the address data included in the neighbor list. Since an email is transmitted after the user of mobile phone 1 moves over a prescribed distance by transportation means, for example, by train, an email can be transmitted automatically to the user who has his/her address within a prescribed range after movement.

Although in the present embodiments, W-CDMA has been described as an example of network, a network in accordance with the PDC (Personal Digital Cellular) method, the GSM (Global System for Mobile) method, or the CDMA (Code Division Multiple Access) method, or a PHS (Personal Handyphone System) network may be employed.

Furthermore, although in the present embodiments, mobile phone 1 has been described as an example of portable terminals, any device, for example, such as PDA (Personal Digital Assistants) may be employed as long as it has a function of transmitting a message such as an email and has a function of storing an address to which a message is transmitted. It is needless to say that the present invention can be understood as a message notification method for executing the message notification process shown in FIG. 7, FIG. 8 and FIG. 10 and a message notification program for allowing a computer to execute the message notification method.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:
1. A portable terminal comprising:
a current positional information obtaining portion to obtain current positional information indicating a current position;
an accepting portion to accept an input by a user;
an address data portion to
receive first positional information, indicating a position of the portable terminal at a first time, from the current positional information obtaining portion,
generate address data in which a name of a different user, at least one address, and the first positional information are associated with each other, wherein the at least one address indicates a transmission destination, and
store the generated address data in an address book;

an extraction portion to perform extraction steps comprising
receiving second positional information, indicating a position of the portable terminal at a second, subsequent time, from the current positional information obtaining portion,
determining that the first positional information of the address data is within a prescribed range from the second positional information, and,
based on the determination that the first positional information is within the prescribed range from the second positional information, extracting the name stored in association with the first positional information from the address data; and
a transmission portion to, after the name has been extracted from the address data by the extraction portion, transmit a prescribed message to the transmission destination indicated by the at least one address associated with the address data.

2. The portable terminal according to claim 1,
wherein the address book comprises a plurality of address data,
wherein the extraction portion determines that positional information from the plurality of address data is within the prescribed range from the second positional information, and, based on the determination that positional information from the plurality of address data is within the prescribed range from the second positional information, extracts a plurality of names stored in association with the positional information from the plurality of address data,
wherein the portable terminal further comprises a selection portion to select or receive a selection of one or more names from the plurality of names, and
wherein said transmission portion transmits said prescribed message to at least one transmission destination indicated by the at least one address associated with each of the one or more selected names in the plurality of address data.

3. The portable terminal according to claim 1, wherein said extraction portion extracts said name when a prescribed operation is accepted by said accepting portion.

4. The portable terminal according to claim 1, wherein said extraction portion extracts said name when a prescribed operation is accepted by said operation accepting portion.

5. A portable terminal comprising:
a current positional information obtaining portion to obtain current positional information indicating a current position;
an accepting portion to accept an input by a user;
an address data portion to
receive first positional information, indicating a position of the portable terminal at a first time, from the current positional information obtaining portion,
generate address data in which a name of a different user, at least one address, and the first positional information are associated with each other, and
store the generated address data in an address book;
an extraction portion to perform extraction steps comprising
receiving second positional information, indicating a position of the portable terminal at a second, subsequent time, from the current positional information obtaining portion,
determining that the first positional information of the address data is within a prescribed range from the second positional information, and,
based on the determination that the first positional information is within the prescribed range from the second positional information, extracting the name stored in association with the first positional information from the address data;
a moving distance detection portion to detect movement of a prescribed distance or longer; and
a moving speed detection portion to detect a moving speed,
wherein said extraction portion performs said extraction steps when a movement of the prescribed distance or longer is detected and a subsequently detected moving speed is a prescribed speed or less.

6. A message notification method comprising:
accepting an input by a user;
in response to the input, generating address data by
receiving first positional information, indicating a position of a portable terminal at a first time,
generating the address data in which a name of a different user, at least one address, and the first positional information are associated with each other, and
storing the generated address data in an address book;
detecting movement of a prescribed distance or longer;
detecting a moving speed; and,
when the movement of the prescribed distance or longer is detected and, subsequently, the detected moving speed is a prescribed speed or less, subsequently performing extraction steps comprising
receiving second positional information, indicating a position of the portable terminal at a second, subsequent time,
determining that the first positional information of the address data is within a prescribed range from the second positional information, and,
based on the determination that the first positional information is within the prescribed range from the second positional information, extracting the name stored in association with the first positional information from the address data.

7. A message notification program embodied on a non-transitory computer-readable storage medium allowing a computer to execute the steps of:
accepting an input by a user;
in response to the input, generating address data by
receiving first positional information, indicating a position of a portable terminal at a first time,
generating the address data in which a name of a different user, at least one address, and the first positional information are associated with each other, and
storing the generated address data in an address book;
detecting movement of a prescribed distance or longer;
detecting a moving speed: and,
when the movement of the prescribed distance or longer is detected and, subsequently, the detected moving speed is a prescribed speed or less, subsequently performing extraction steps comprising
receiving second positional information, indicating a position of the portable terminal at a second, subsequent time,
determining that the first positional information of the address data is within a prescribed range from the second positional information, and,
based on the determination that the first positional information is within the prescribed range from the second positional information, extracting the name stored in association with the first positional information from the address data.

8. A message notification method comprising:
accepting an input by a user;
in response to the input, generating address data by
- receiving first positional information, indicating a position of a portable terminal at a first time,
- generating the address data in which a name of a different user, at least one address, and the first positional information are associated with each other, wherein the at least one address indicates a transmission destination, and
- storing the generated address data in an address book;

subsequently, performing extraction steps comprising
- receiving second positional information, indicating a position of the portable terminal at a second, subsequent time,
- determining that the first positional information of the address data is within a prescribed range from the second positional information, and,
- based on the determination that the first positional information is within the prescribed range from the second positional information, extracting the name stored in association with the first positional information from the address data; and, after the name has been extracted from the address data by the extraction steps, transmitting a prescribed message to the transmission destination indicated by the at least one address associated with the address data.

9. The message notification method according to claim 8, wherein the address book comprises a plurality of address data,
wherein the extraction steps comprise determining that positional information from the plurality of address data is within the prescribed range from the second positional information, and, based on the determination that positional information from the plurality of address data is within the prescribed range from the second positional information, extracting a plurality of names stored in association with the positional information from the plurality of address data
wherein the method further comprises selecting or receiving a selection of one or more names from the plurality of names, and
wherein said transmitting includes transmitting said prescribed message to at least one transmission destination indicated by the at least one address associated with each of the one or more selected names in the plurality of address data.

10. The message notification method according to claim 9, wherein said extraction steps are performed when a prescribed operation is received from a user.

11. The message notification method according to claim 8, wherein said extraction steps are performed when a prescribed operation is received from a user.

12. A message notification program embodied on a non-transitory computer-readable storage medium allowing a computer to execute the steps of:
accepting an input by a user;
in response to the input, generating address data by
- receiving first positional information, indicating a position of a portable terminal at a first time,
- generating the address data in which a name of a different user, at least one address, and the first positional information are associated with each other, wherein the at least one address indicates a transmission destination, and
- storing the generated address data in an address book;

subsequently performing extraction steps comprising
- receiving second positional information, indicating a position of the portable terminal at a second, subsequent time,
- determining that the first positional information of the address data is within a prescribed range from the second positional information, and,
- based on the determination that the first positional information is within the prescribed range from the second positional information, extracting the name stored in association with the first positional information from the address data; and transmitting a prescribed message to the transmission destination indicated by the at least one address associated with the address data.

13. The message notification program according to claim 12,
wherein the address book comprises a plurality of address data,
wherein the extraction steps comprise determining that positional information from the plurality of address data is within the prescribed range from the second positional information, and, based on the determination that positional information from the plurality of address data is within the prescribed range from the second positional information, extracting a plurality of names stored in association with the positional information from the plurality of address data,
wherein the program further allows the computer to execute steps comprising selecting or receiving a selection of one or more names from the plurality of names, and
wherein said transmitting includes the step of transmitting said prescribed message to at least one transmission destination indicated by the at least one address associated with each of the one or more selected names in the plurality of address data.

14. The message notification program according to claim 13, wherein said extraction steps are performed when a prescribed operation is received from a user.

15. The message notification program according to claim 12, wherein said extraction steps are performed when a prescribed operation is received from a user.

* * * * *